(12) United States Patent
Pool

(10) Patent No.: US 9,850,938 B2
(45) Date of Patent: Dec. 26, 2017

(54) FASTENER WITH LOOP OR HOOK

(71) Applicant: Jordan M Pool, Ukiah, CA (US)

(72) Inventor: Jordan M Pool, Ukiah, CA (US)

( * ) Notice: Subject to any disclaimer, the term of this patent is extended or adjusted under 35 U.S.C. 154(b) by 0 days.

(21) Appl. No.: 15/212,122

(22) Filed: Jul. 15, 2016

(65) Prior Publication Data

US 2016/0363158 A1    Dec. 15, 2016

Related U.S. Application Data

(60) Division of application No. 14/797,423, filed on Jul. 13, 2015, now abandoned, which is a continuation-in-part of application No. 29/520,036, filed on Mar. 10, 2015, now Pat. No. Des. 790,329.

(60) Provisional application No. 62/089,872, filed on Dec. 10, 2014.

(51) Int. Cl.
| | |
|---|---|
| *F16M 13/00* | (2006.01) |
| *F16B 45/00* | (2006.01) |
| *F16B 23/00* | (2006.01) |
| *F16B 35/06* | (2006.01) |

(52) U.S. Cl.
CPC ............ *F16B 45/00* (2013.01); *F16B 23/00* (2013.01); *F16B 23/0007* (2013.01); *F16B 35/06* (2013.01)

(58) Field of Classification Search
CPC ........ A47F 5/0006; F16B 45/00; F16B 23/00; F16B 23/0007; F16B 2015/0076; F16B 35/06
USPC ...... 411/82.2, 82.3, 400; 248/301, 304, 547, 248/303
See application file for complete search history.

(56) References Cited

U.S. PATENT DOCUMENTS

| | | | |
|---|---|---|---|
| 102,945 A | 5/1870 | Judd | |
| 377,611 A | 2/1882 | Harley | |
| 353,013 A | 11/1886 | Braddock | |
| D24,189 S | 4/1895 | Beardley | |
| D25,548 S | 4/1896 | Hayden | |
| 815,019 A * | 3/1906 | Kampfe | F16B 15/04 |
| | | | 248/546 |
| D59,977 S | 12/1921 | Parker | |
| D119,843 S | 4/1940 | Anstice | |
| D121,897 S | 8/1940 | Hager | |
| 3,022,197 A | 2/1962 | Jedlicka | |
| 3,216,684 A | 11/1965 | Larson | |
| 5,207,404 A | 5/1993 | Reinhard | |
| 5,252,016 A | 10/1993 | Schmid et al. | |
| D384,574 S | 10/1997 | Cox | |
| 5,992,910 A | 11/1999 | Kwon | |
| 6,536,730 B1 * | 3/2003 | Baer | F16B 45/00 |
| | | | 248/304 |
| D540,156 S | 4/2007 | Bryant | |

(Continued)

FOREIGN PATENT DOCUMENTS

| | | |
|---|---|---|
| DE | 2431953 A1 | 2/1976 |
| WO | 2014/177730 A1 | 11/2014 |

OTHER PUBLICATIONS

Internation Search Report and Written Opinion of the ISA in PCT/US15/64321.

*Primary Examiner* — Christopher Garft
(74) *Attorney, Agent, or Firm* — Edward S. Sherman

(57) ABSTRACT

A threaded hook or eye loop has a tool receptacle at the end of the threaded shank with the hook or loop configured for rotary insertion with a power tool or hand tool that directly rotates the threaded shaft.

20 Claims, 17 Drawing Sheets

(56) References Cited

U.S. PATENT DOCUMENTS

| 2006/0239797 | A1* | 10/2006 | Evanbar | F16B 5/0241 |
| | | | | 411/542 |
| 2007/0292241 | A1* | 12/2007 | Snow | F16B 39/225 |
| | | | | 411/542 |
| 2011/0186702 | A1 | 8/2011 | Broadley | |
| 2013/0058736 | A1 | 3/2013 | Auchey | |

* cited by examiner

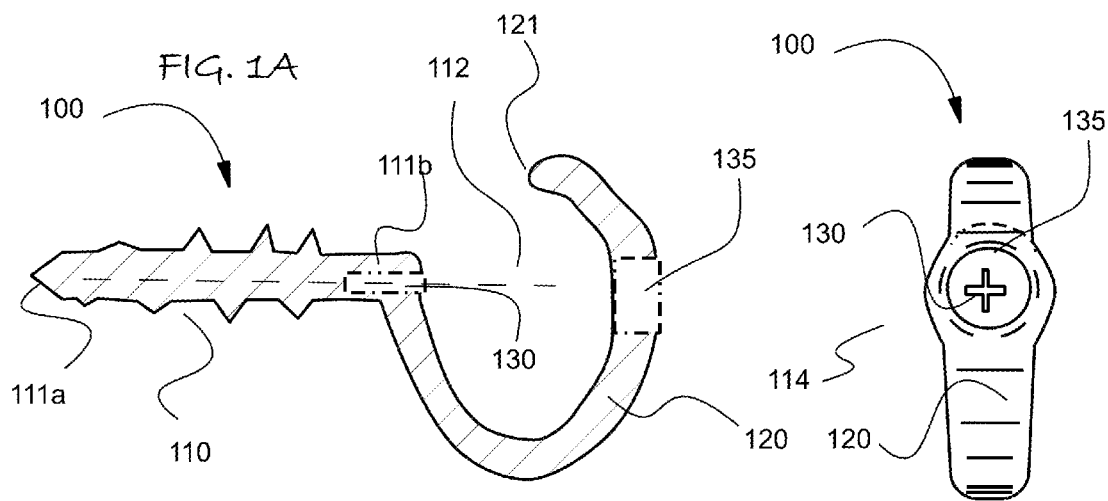
FIG. 1A
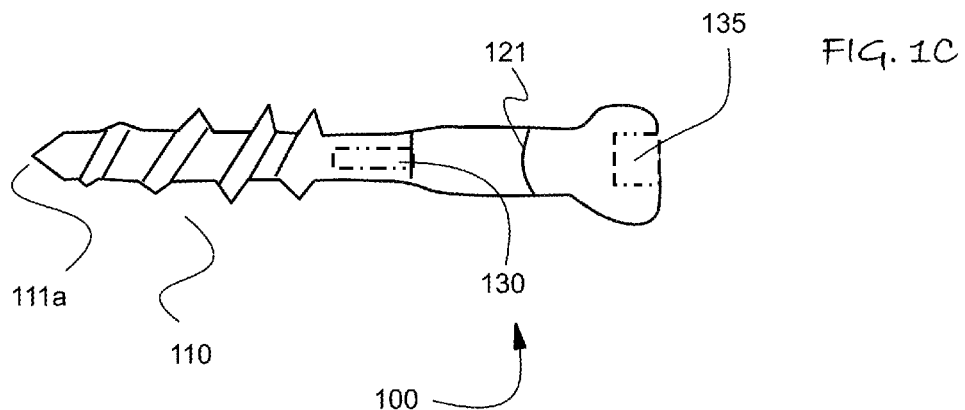
FIG. 1C
FIG. 1B

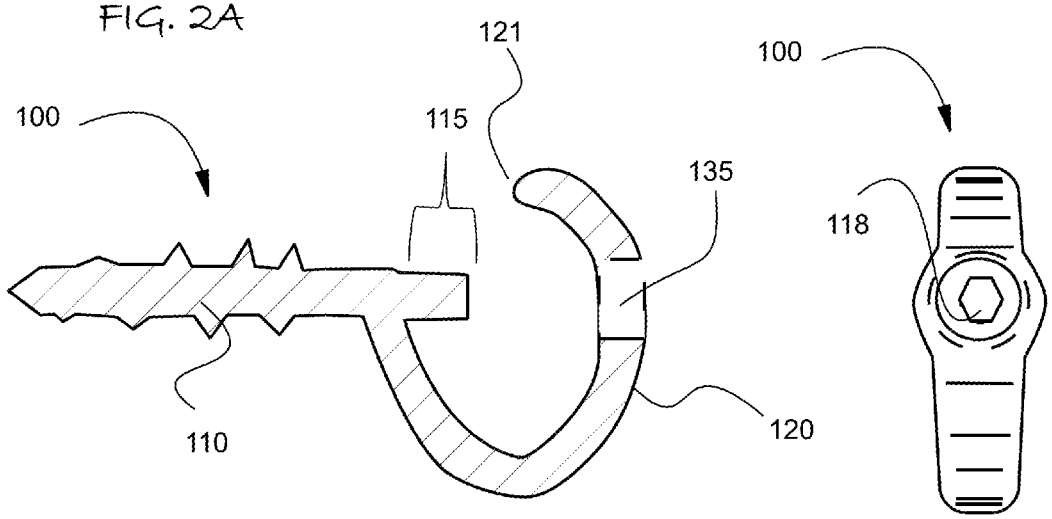
FIG. 2A
FIG. 2C
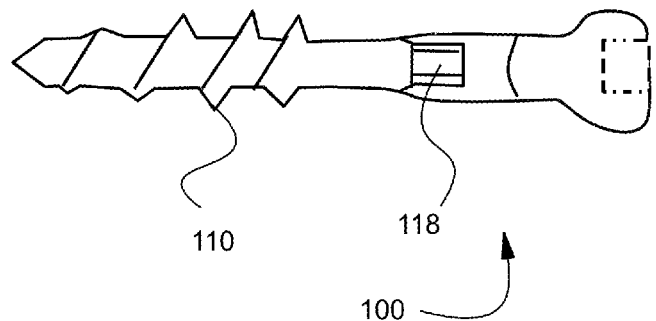
FIG. 2B

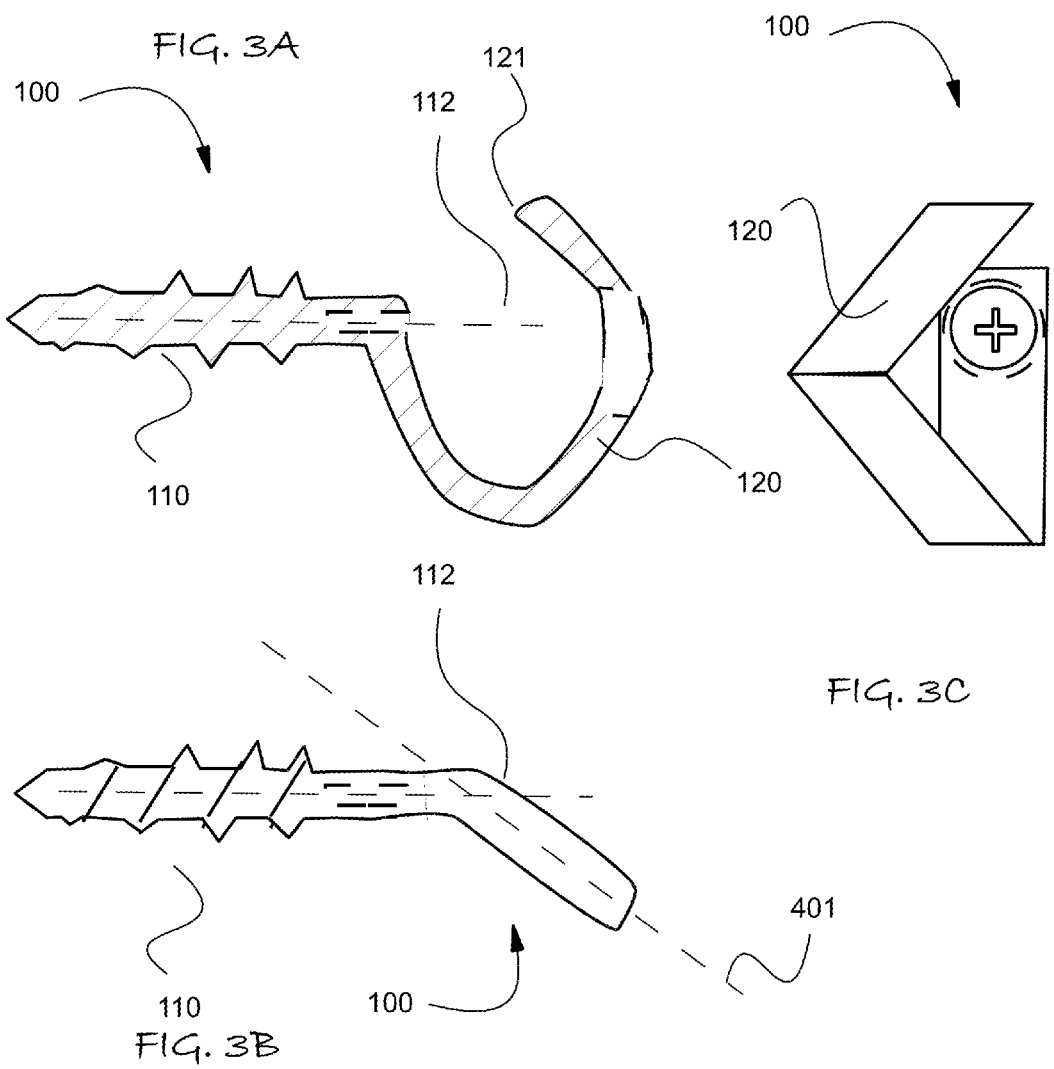

FIG. 4A
100
110
112
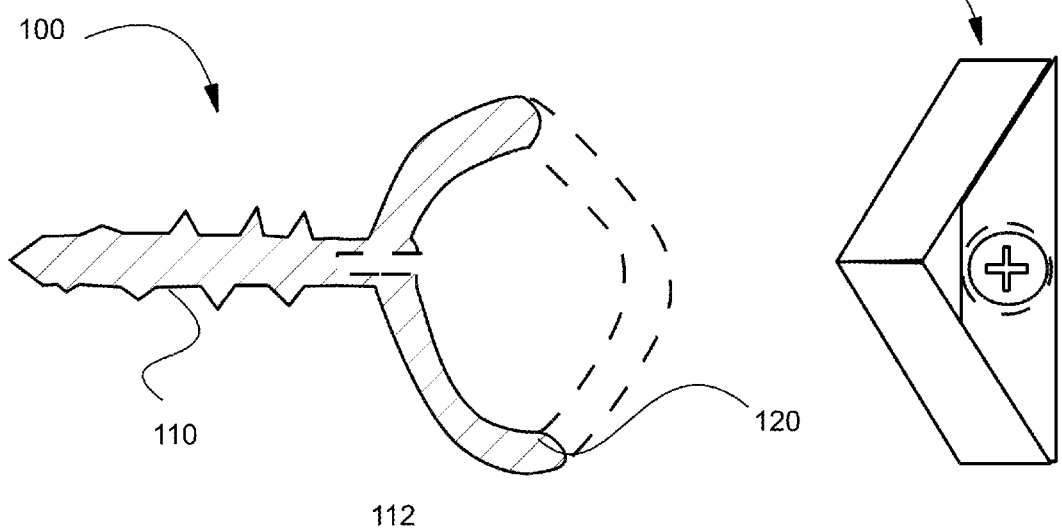
FIG. 4C
100
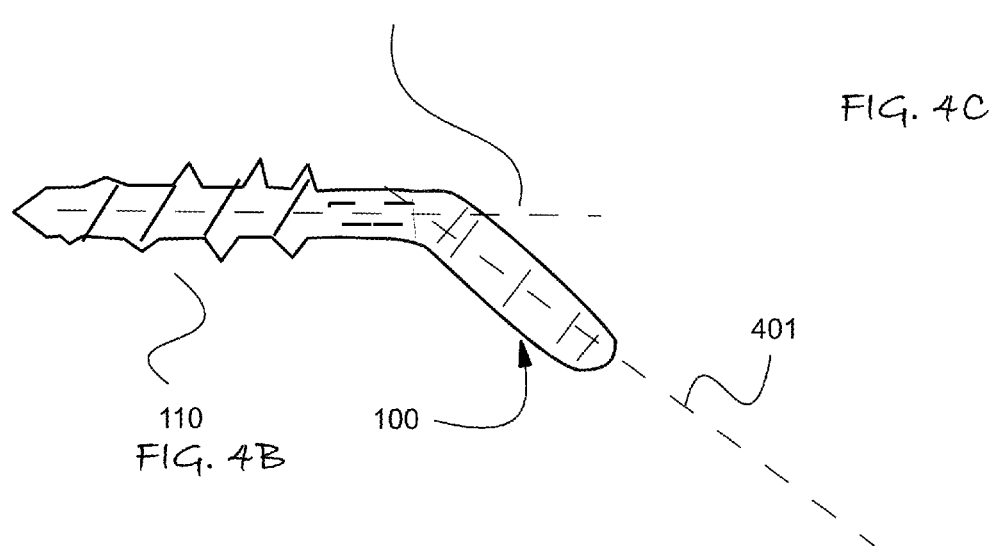
110    100
FIG. 4B
401

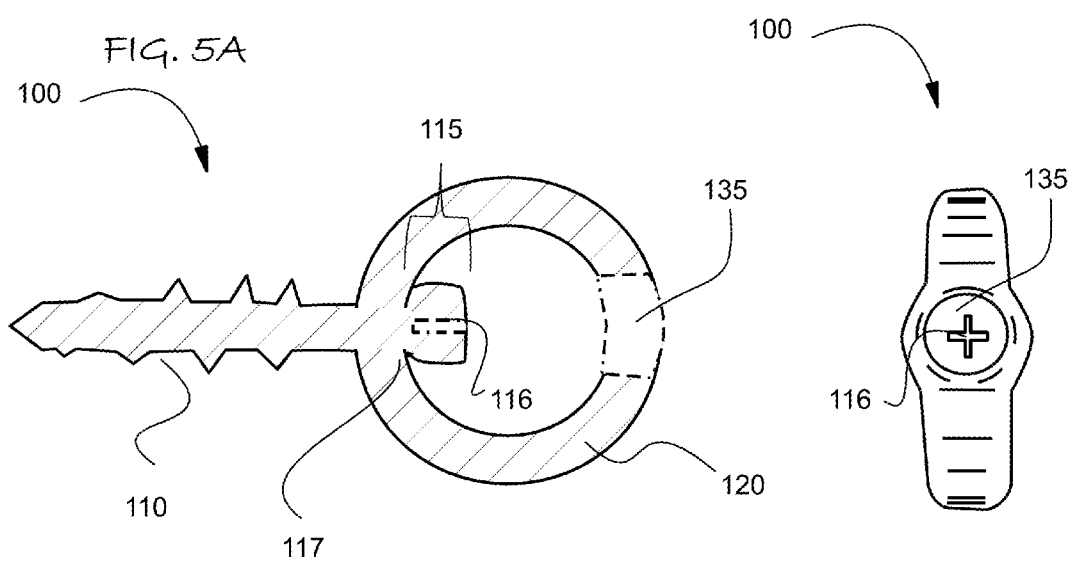
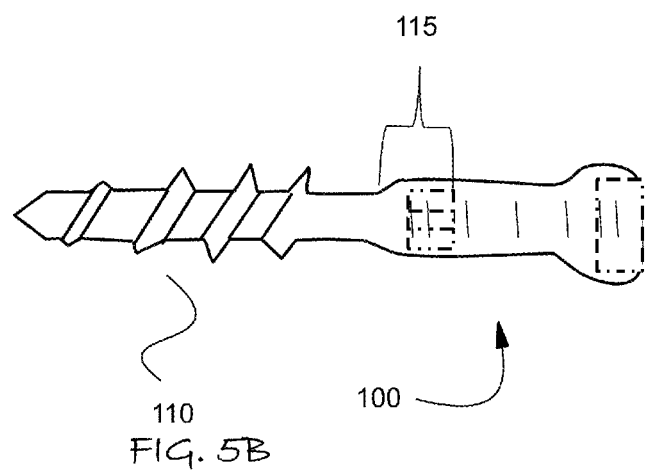

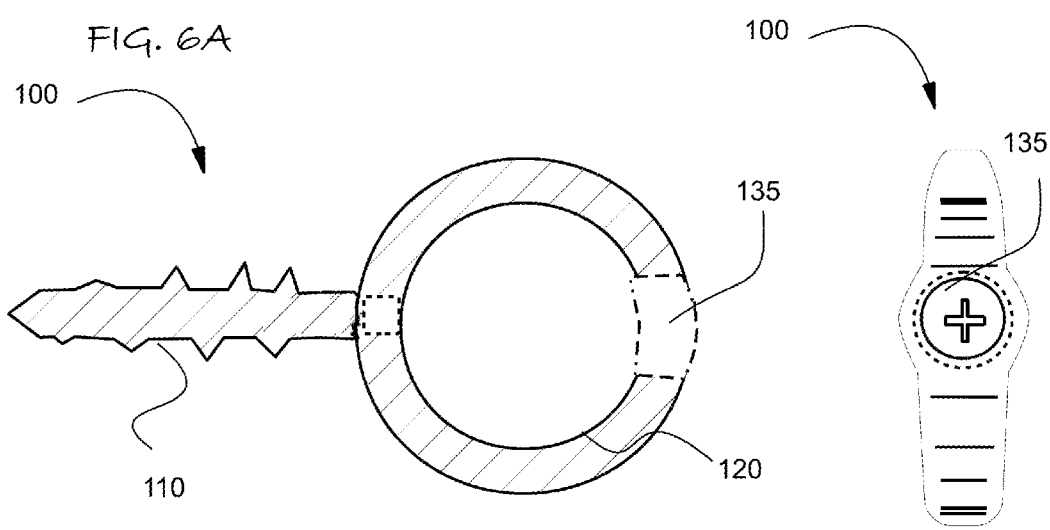
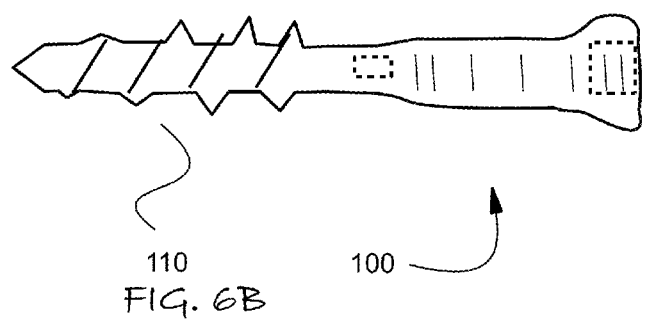

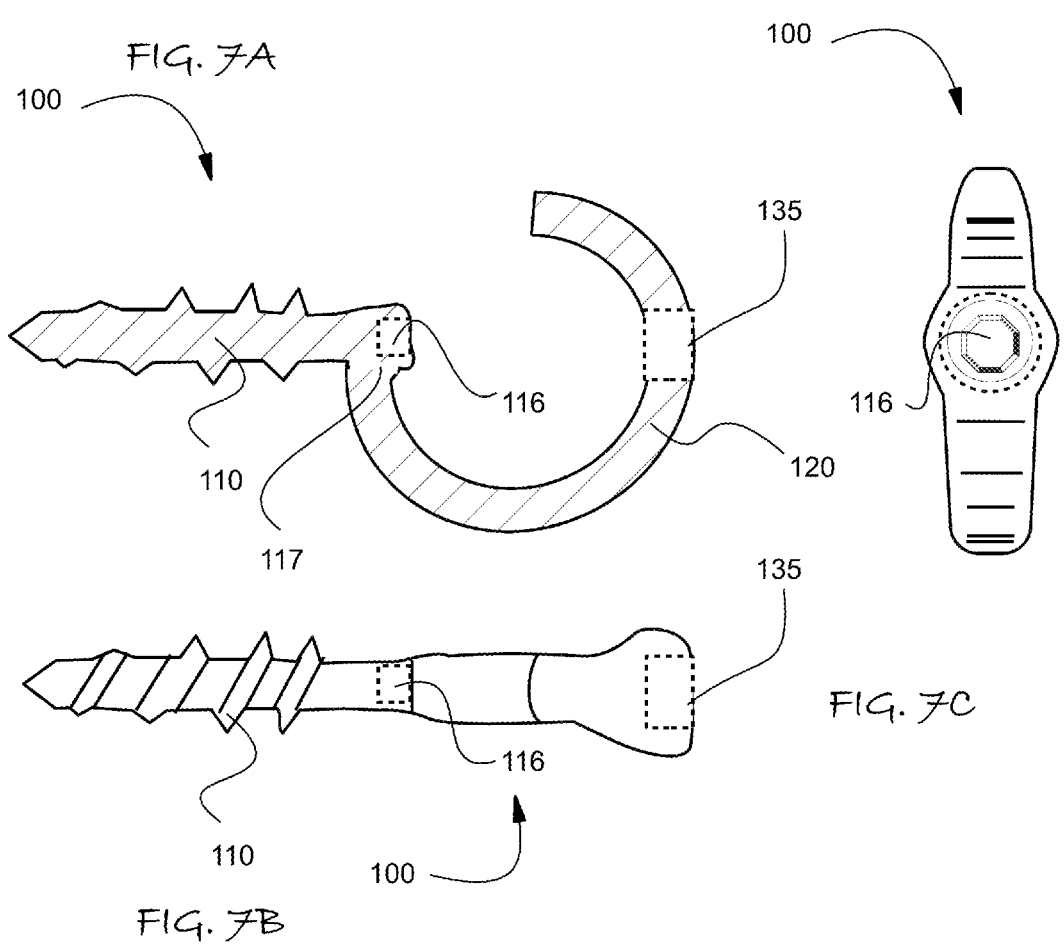

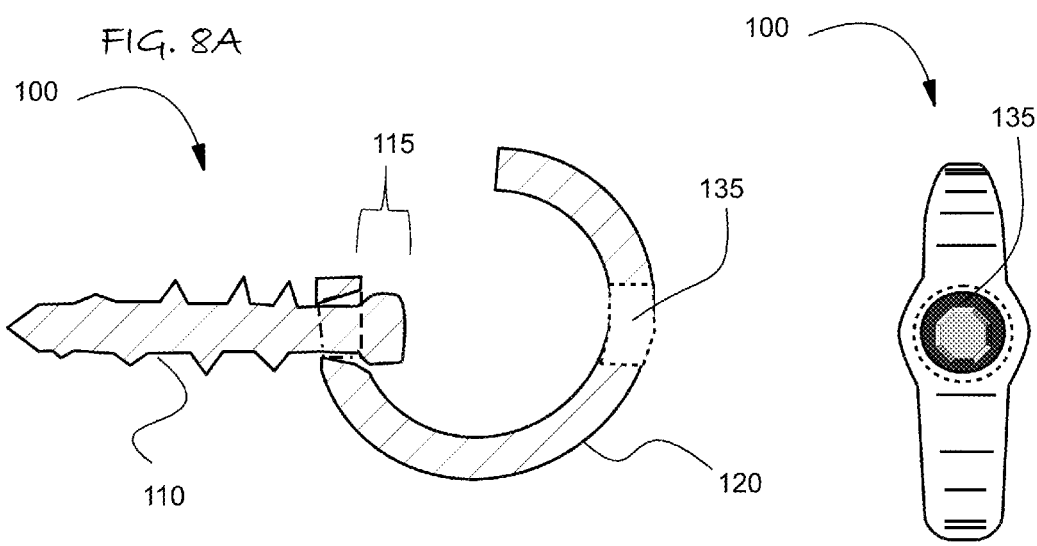
FIG. 8A
FIG. 8C
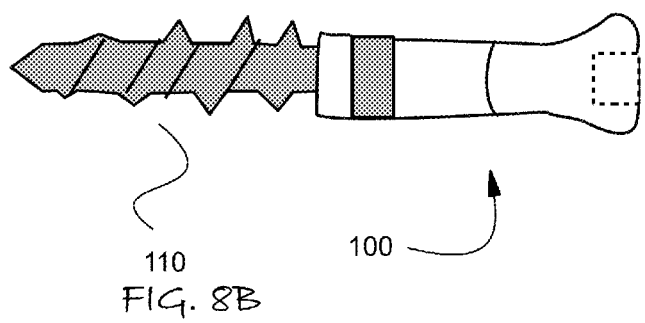
FIG. 8B

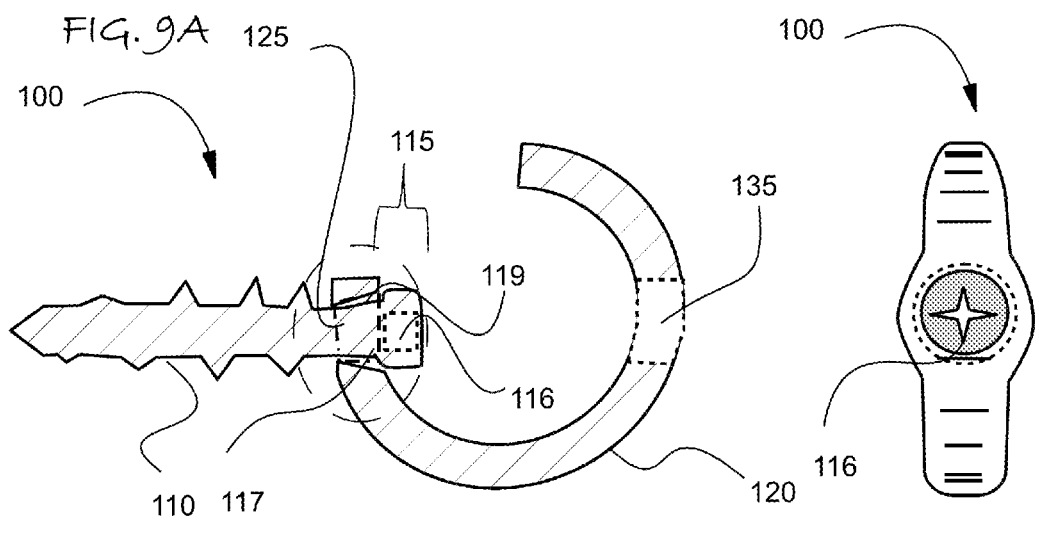
FIG. 9A
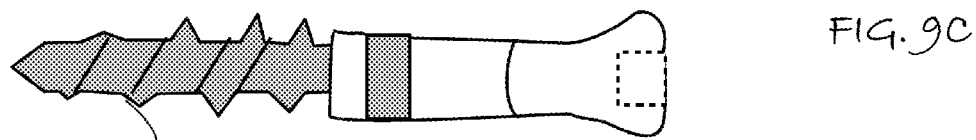
FIG. 9B
FIG. 9C
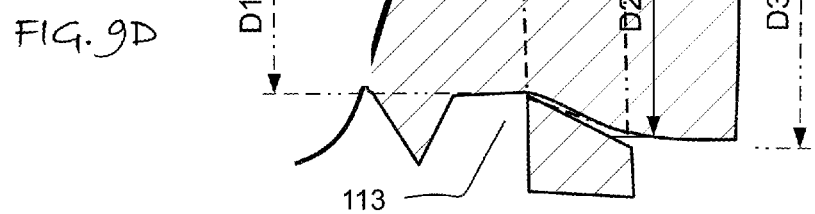
FIG. 9D

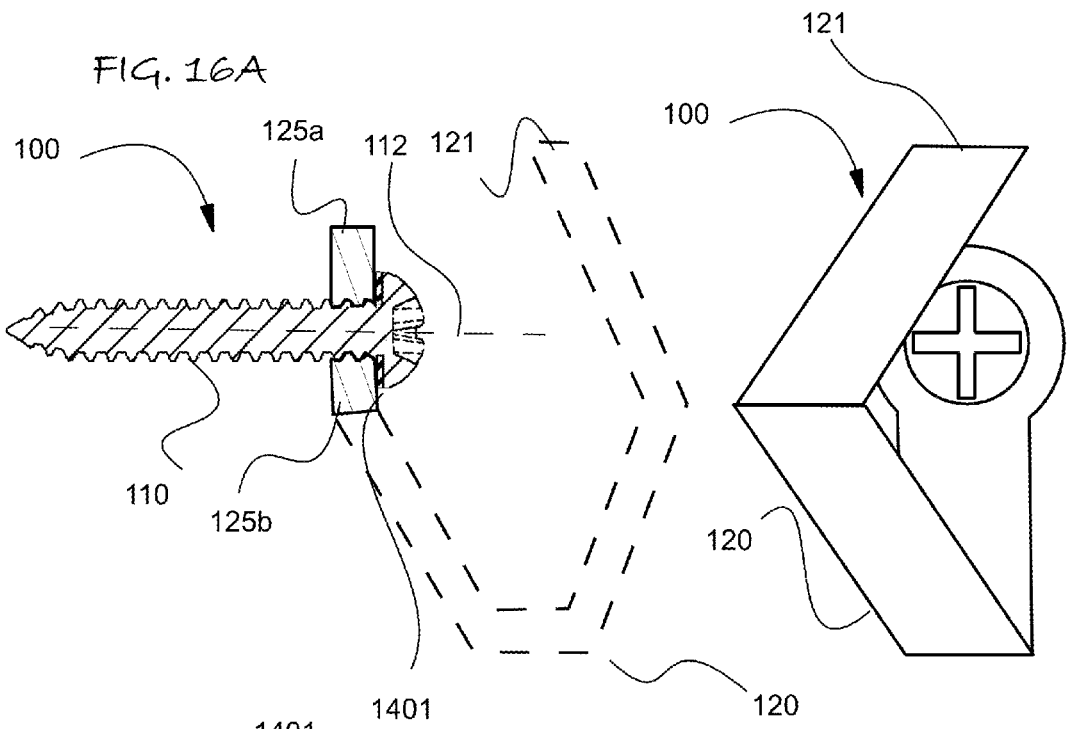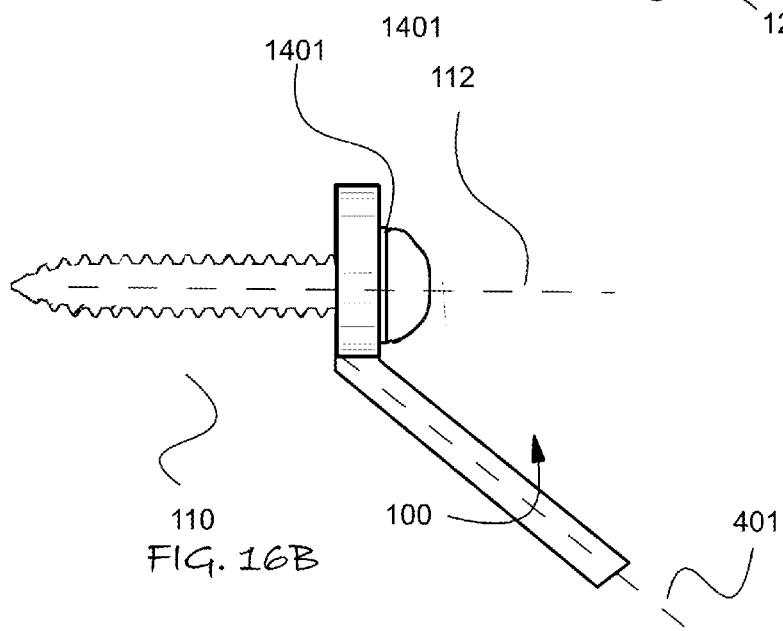

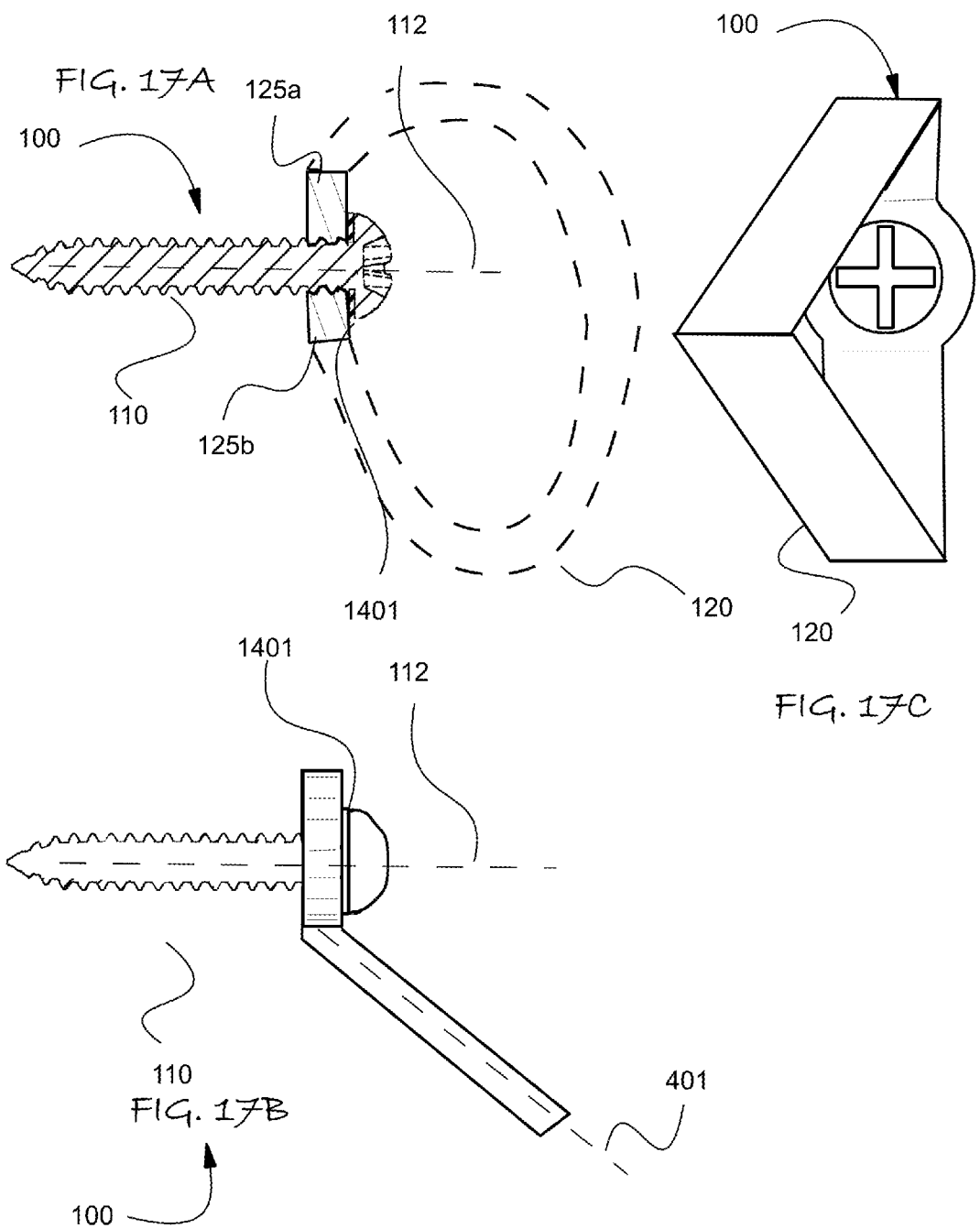

FASTENER WITH LOOP OR HOOK

CROSS REFERENCE TO RELATED APPLICATIONS

The present application is a Division of and claims the benefit of priority to the U.S. Non-provisional patent application of the same title, which was filed on 13 Jul. 2016, having application Ser. No. 14/797,423, which in turn claims the benefit of priority to the U. S. Provisional Patent application filed on Dec. 10, 2014, having application Ser. No. 62/089,872, both of which are incorporated herein by reference.

The present application also claim the benefit of priority to the U.S. Design patent application filed on Mar. 10, 2015, having application Ser. No. 29/520,036, which is also incorporated herein by reference.

BACKGROUND OF INVENTION

The field of inventions is threaded axial fasteners, such as screws or bolts, having loops, hooks or eyelets opposite the threaded end that is intended for insertion into objects, and more particularly those more specifically suitable for insertion with rotary driving tools, such as power tools.

Threaded fasteners and supports that end with an open loop, which is a hook, or a closed loop, such as eye bolts and the like, is usually inserted by hand into a pilot hole or threaded insert.

U.S. Pat. No. 5,252,016, issued to Schmid et al. on Oct. 12, 1993, describes such fasteners that can be inserted by power tool by placing the driver receptacle on the outside of the loop or hook, opposite the end of the threaded shank. However, this solution also makes it more difficult to align the fastener shank normal to the wall, which is co-axial with the pilot hole, to start insertion. This is most difficult with heavy, bulky or cumbersome power tools, especially in awkward orientation, which make it more likely for the user or tradesman to tilt the tool off axis. When the power tool is more distal from the shank tip, the torque lever arm increases to urge the shank to tilt prior to insertion. Accordingly, even such an improved fastener is best started by hand instead of using a power tool.

It would be an advantage to have such a loop or hook type fastener that can be both started and fully inserted with the same power tool.

It would be a further advantage if such fastener devices can be inserted with one hand frees, to provide greater worker safety and increase efficiency.

The above and other objects, effects, features, and advantages of the present invention will become more apparent from the following description of the embodiments thereof taken in conjunction with the accompanying drawings

SUMMARY OF INVENTION

In the present invention, the first object is achieved by a method of installing a wall or ceiling mountable fastener, the method comprising the steps of providing a fastener having: a first eyelet loop having a rear surface that defines a first plane for making contact with receiving member, a front surface opposing the rear surface and a first inner channel extending from the front surface to the rear surface thereof for receiving a threaded fastener through a central axis of the first inner channel, the central axis being orthogonal to the first plane, a first downward portion connected at a proximal end to the first eyelet, and having a distal end opposite the proximal end, a second upward extending portion connected at a proximal end to the distal end of the first downward extending portion, and having a distal end opposing the proximal end that is disposed above the first eyelet, wherein a first sub-portion of the second upward extending portion that is at the level of first eyelet does not intersect the first central axis, a threaded shaft that has a threaded portion with a distal end that extends beyond the first eyelet in the direction opposite the second upward extending portion, the shaft having a proximal end opposite the distal end, a head coupled to the end of the threaded shaft that extends through the first inner channel being disposed on the opposing side of the first eyelet from the distal end of the thread shaft, wherein the head of the shaft has a means for receiving a rotary driver tool, wherein the threaded shaft and head are coupled to the fastener proximal to the first eyelet with a detachable adhesive, placing the distal end of the threaded shaft against the receiving member, engaging the head of the threaded shaft with the rotary driver tool, energizing the rotary driver tool to rotate the fastener and threaded shaft as a connected unit so the distal end of the threaded shaft penetrates the receiving member, continuing to energize the rotary driver tool to urge the rear surface of the first eyelet against receiving member at least until a sufficient rotary friction sufficient to disengage the adhesive connect of the threaded shaft and the head is applied by the rotary driver tool wherein the fastener no longer rotates with the head of the thread shaft as the rear surface of the first eyelet frictionally engage the receiving member.

A second aspect of the invention is characterized by such a method further comprising the steps of a) modifying the angular orientation of the fastener by manually urging at least one of the first downward and second upward portion thereof and b) energizing the rotary driver tool to rotate the threaded shaft until the rear surface of the first eyelet frictionally engages the receiving member to preclude further manual modification of the angular position of the fastener.

Another aspect of the invention is characterized by any such method wherein the first sub-portion of the second upward extending portion of the fastener has a larger inner diameter than the head of the threaded shaft.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation of a first embodiment of the invention, whereas FIG. 1B is top plan view thereof and FIG. 1C is a rear elevation view thereof showing the fastener device as viewed from the outside of a receiving member.

FIG. 2A is a cross-sectional elevation of another embodiment of the invention, whereas FIG. 2B is top plan view thereof and FIG. 2C is a rear elevation view thereof showing the fastener device as viewed from the outside of a receiving member.

FIG. 3A is a cross-sectional elevation of another embodiment of the invention, whereas FIG. 3B is top plan view thereof and FIG. 3C is a rear elevation view thereof showing the fastener device as viewed from the outside of a receiving member.

FIG. 4A is a cross-sectional elevation of another embodiment of the invention, whereas FIG. 4B is top plan view thereof and FIG. 4C is a rear elevation view thereof showing the fastener device as viewed from the outside of a receiving member.

FIG. 5A is a cross-sectional elevation of another embodiment of the invention, whereas FIG. 5B is top plan view thereof and FIG. 5C is a rear elevation view thereof showing the fastener device as viewed from the outside of a receiving member.

FIG. 6A is a cross-sectional elevation of another embodiment of the invention, whereas FIG. 6B is top plan view thereof and FIG. 6C is a rear elevation view thereof showing the fastener device as viewed from the outside of a receiving member.

FIG. 7A is a cross-sectional elevation of another embodiment of the invention, whereas FIG. 7B is top plan view thereof and FIG. 7C is a rear elevation view thereof showing the fastener device as viewed from the outside of a receiving member.

FIG. 8A is a cross-sectional elevation of another embodiment of the invention, whereas FIG. 8B is top plan view thereof and FIG. 8C is a rear elevation view thereof showing the fastener device as viewed from the outside of a receiving member.

FIG. 9A is a cross-sectional elevation of another embodiment of the invention, whereas FIG. 9B is top plan view thereof and FIG. 9C is a rear elevation view thereof showing the fastener device as viewed from the outside of a receiving member, whereas FIG. 9D is an expanded view of the circled portion of FIG. 9A.

FIG. 16A is a cross-sectional elevation of another embodiment of the invention, whereas FIG. 16B is top plan view thereof and FIG. 16C is a rear elevation view thereof showing the fastener device as viewed from the outside of a receiving member.

FIG. 17A is a cross-sectional elevation of another embodiment of the invention, whereas FIG. 17B is top plan view thereof and FIG. 17C is a rear elevation view thereof showing the fastener device as viewed from the outside of a receiving member.

DETAILED DESCRIPTION

Figure 10:
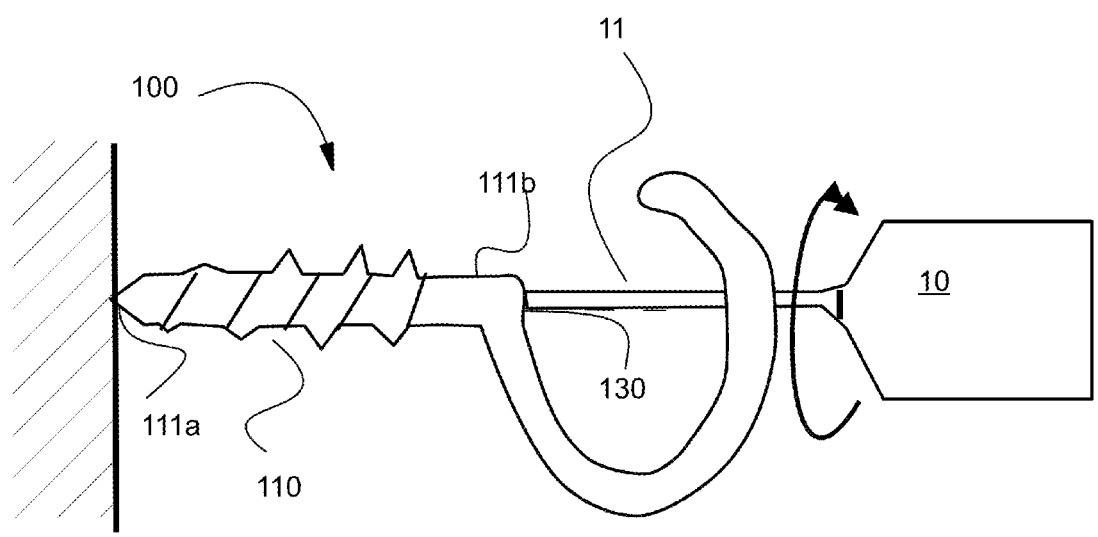
FIG. 10 is an exterior elevation view of a driver tool about to insert the fastener of the FIG. 1A-C into a wall or other supporting member.

Referring to FIGS. 1A through 17C, wherein like reference numerals refer to like components in the various views, there is illustrated therein a new and improved threaded fastener with loop or hook, generally denominated 100 herein.

In accordance with the present invention the threaded fastener with loop or hook 100 comprises a threaded shank 110 configured for insertion into a work piece at the distal end 111a, with a hook or loop 120 attached toward or at the proximal end 111b. The threaded hook or eye loop 100 has a tool receptacle 130 at the end 111b of the threaded shank 110 with the hook or loop configured for rotary insertion with a power tool or hand tool that directly rotates the threaded shaft or shank 110. The hook or loop 120 is configured so that the tool receiving member 130 at the proximal end can 111b can be accessed by the working end 11 of a linear drive tool 10, which is connected outside the loop 120. The loop 120 forms a hook when it is open in the top or distal end 121, in which it does not reconnect or couple at the opposing end to the shank 110. FIG. 10 illustrates one embodiment of the fastener 100, from FIG. 1A-C, being inserted with the driving tool 10 in which the working end 11 thereof engage the tool receiving member 130 for rotating the fastener 100 to advance end 111a into the work piece to the left.

The loop 120 is configured in the various embodiments with means for clearance of a tool to axially rotate the shank 110. These configurations, explained in greater detail below, allow the insertion and driving of threaded hooks and eye bolts with a power tool. They also facilitate the alignment of the driving tool and threaded fastener 100 normal to the attachment surface. In selected embodiments, the threaded portion of the fastener 100 is stabilized by the driving tool. In such an embodiment, the bore 135 in the loop 120 extends around and maintains alignment of the driving tool working end parallel to the bore 130 walls and the central axis 112 of the threaded shank 110.

In the case of simple linear drive tool, such a screw drivers and electric screw drivers, a conventional hook or loop would preclude the drive shaft of the tool from reaching the tool receiving portion 130 and also being aligned with the axis 112 of the shank 110, as the shank axis 112 and tool axis need to be co-linear for rotating the shank about its axis.

In the various embodiment of the instant invention this is overcome in two alternative methods in which the hook or loop 120 either is offset sideways to allow driver access, or has a bore 135 to receive the driver.

The outward loop 120 extends at least below the lower vertical extent (reference line 114 in FIG. 1C) of the shank 110 as it extends away from the shank 114. This provides a large loop 120 with significant support or holding capacity and strength.

In an alternative embodiment of FIGS. 2, 5, 8, 9 and 11, the loop 120 is connected to the shank 110 between the first end 111a and the second end 111b, to leave an extending portion 115 beyond the first connection of the loop 120. Thus, portion 115 extends toward an opposing end of the loop 120.

In some embodiments (FIGS. 5, 7 and 9A-C) the extending portion 115 of the shank 110 has a polygonal opening 116 and the depth of the polygonal opening 116 extends no further than the connection 117 of the loop 120 to the shank 110. Alternatively, as shown in FIG. 2 the extending portion 115 can have a bolt head 118 for receiving a driving tool. Limiting the initiation of the loop 120 until beyond the opening 116 avoids the loss of material to the opening or recess 130 from weakening the strength of the loop 120, or provides a stronger loop 120 for the amount of material used. In other words, an opening placed within the path between the shank 110 and the loop 120 reduces the cross-section of the stress bearing portion of the fastener 100 when an object is supported by the loop 120.

As shown in the embodiment of FIGS. 8A-C, 9A-D and 12, and more particularly the expanded portion of the FIG. 9A in FIG. 9D, the loop 120 and shank 110 are optionally separable. In these embodiments, threaded shank 110 has an annular recess 113 proximal to the second end 111b with the recess 113 having a first diameter D1, and the portions of the shank 110 adjacent the annular recess 113 each having a third diameter D3 that is larger than the first diameter. The loop 120 has a channel 125 with a second diameter D2 greater than the first diameter and less than the third diameter. Hence, the annular recess 113 of the shank 110 is retained within the channel 125.

A means for clearing the axial extension of the shank 110 is the bore 135 in the loop 120 that is disposed at the intersection of an outward extension from the primary axis 112. In the embodiments in which the shank 110 and loop 120 are separable, the channel 125 and bore 130 would co-align to a common cylindrical axis 112 with the shank 110. An alternative means for clearing the axial extension of the shank 110 is shown in FIGS. 3A-C and 4A-C, in which the fastener 110 deploys an oblique angular displacement of the portion of the loop 120 that is opposite the axial extension of the shank 110 toward the distal portion of the loop 120. The angular displacement can be defined with respect to a reference plane 401 containing the outward portion of the loop 112 which is at an oblique angle with respect to the shank axis 112.

In order to maintain maximum strength of the loop 120, in the more preferred embodiment the portion of the loop 120 having the bore 135 bulges outward to maintain the same cross-section area as the portions of the loop 120 between the bore 135 and the shank 110

In FIG. 3A-C, the loop 120 is open at the top, but avoids interfering with the driver hole by extending laterally after reaching a low point, and then on rising extends laterally in the opposing direction before rising above tool end 130. Hence, loop 120 is composed of 3 attached segments 120a, 120b and 120c, which terminates in end 121.

In FIG. 4A-C, the loop 120 is closed, but avoids interfering with the driver hole 130 by extending laterally after reaching a low point, and then rising as it extends laterally in the opposing direction until above shank end 111b, but the extends downward to connect just forward of shank end 111b.

The loop 120 is optionally open or closed, as shown in FIG. 4A-C, 5A-C, 6A-C, FIG. 15 and FIG. 17A-C. It should be appreciated that to form a hook of reasonable proportion to support or hold items, the open loop 120 preferably extends above the shank 110 after extending below it.

Figure 11:
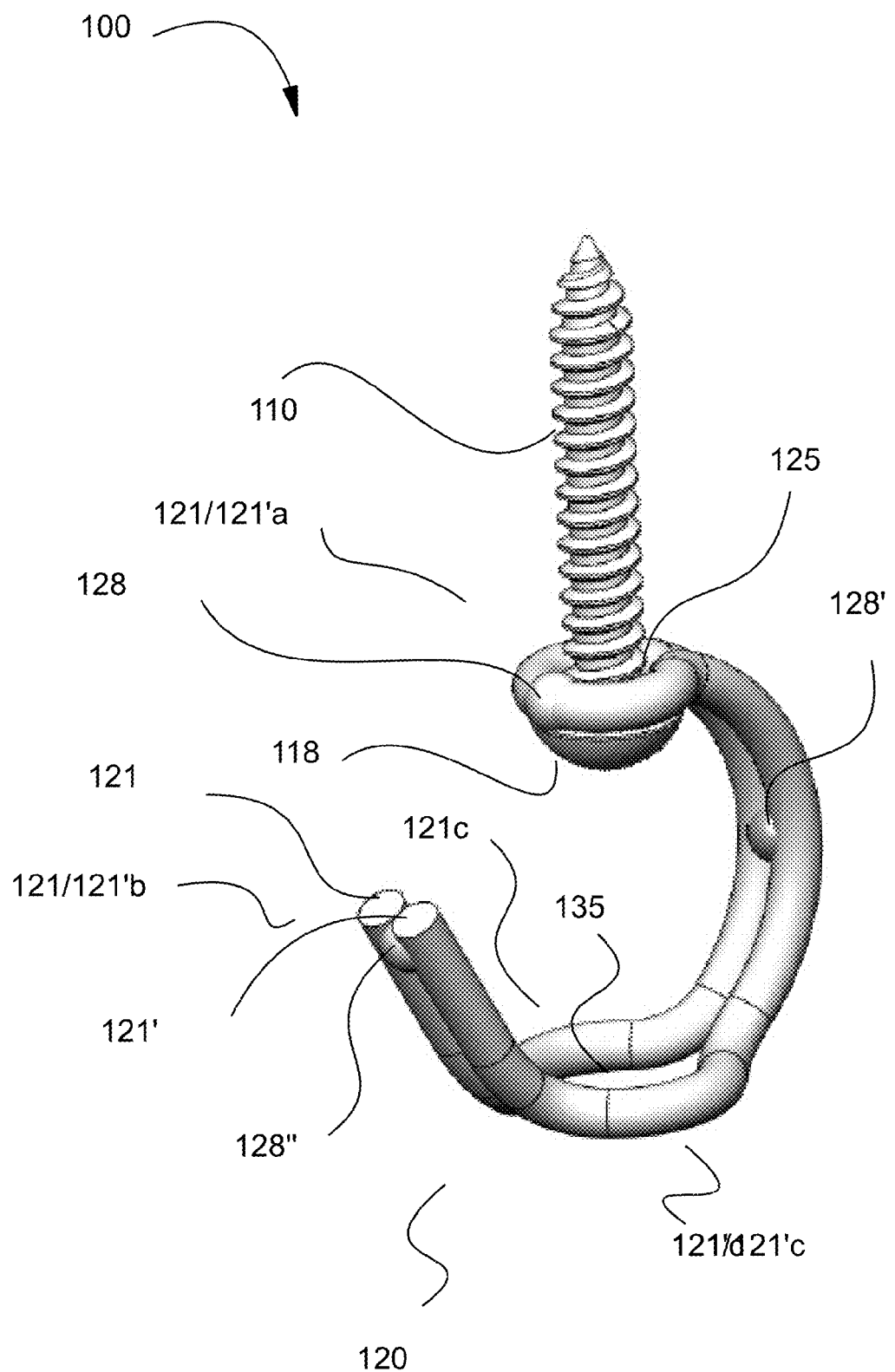
FIG. 11 is a perspective view of another embodiment of the invention in which the fastener is fabricated from one or more elongated members with circular cross-sections that are attached to a screw.

In the embodiment of FIG. 11 the fastener is fabricated from one or more elongated members with circular cross-sections are bent or forged to form mirror image mating pairs 121 and 121' of split hook shaped preform that are attached to the threaded shank 110 after forming. The portion of the loop 120 having the bore 135 is defined by convex outward bow 121/121'c of each mating pair 121 and 121' between the proximal 121/121'a and distal ends 121/121b. The portion of the each elongated member adjacent proximal ends 121/121'a are bent to a semi-circular shape for attachment to the shank 111 just below the bolt head 118, where they are preferably joined thereto by at least one weld 128. Additional welds 128' and 128" join the mating halves 121 and 121' at the distal ends 121/121'b and between the proximal end 121/121'a and the bore 135 defined by the gap between arced segment 121c and 121'c. The shank head 118 having the Philips style receiving driver slot extends beyond the proximal end connection of the completed loop 120 to the shank 110 circa weld 128.

Figure 12:
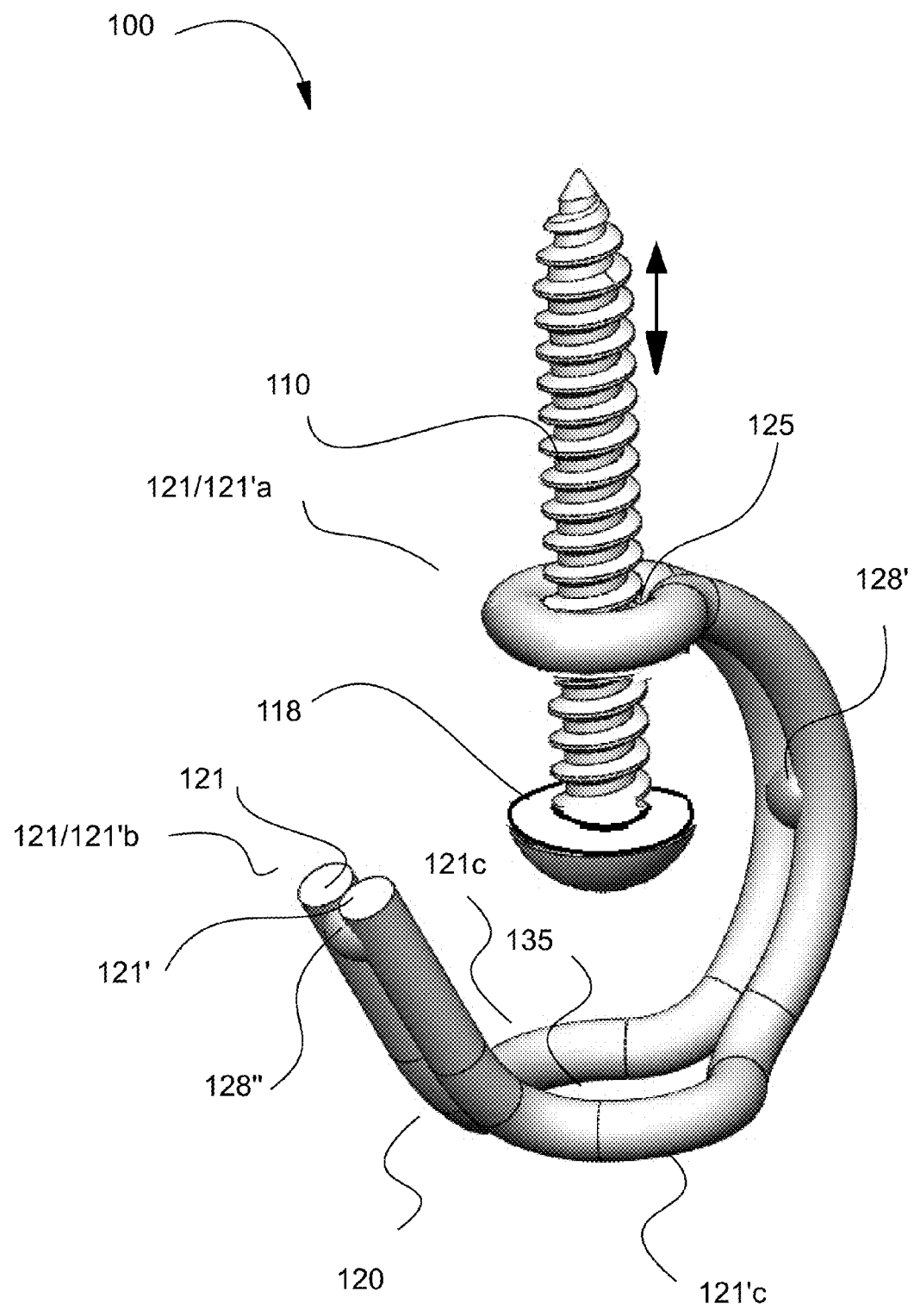
FIG. 12 is a perspective view of another embodiment of the invention in which the fastener is a hook fabricated from one or more elongated members with circular cross-sections that receives a screw in the eyelet portion thereof.
Figure 13:
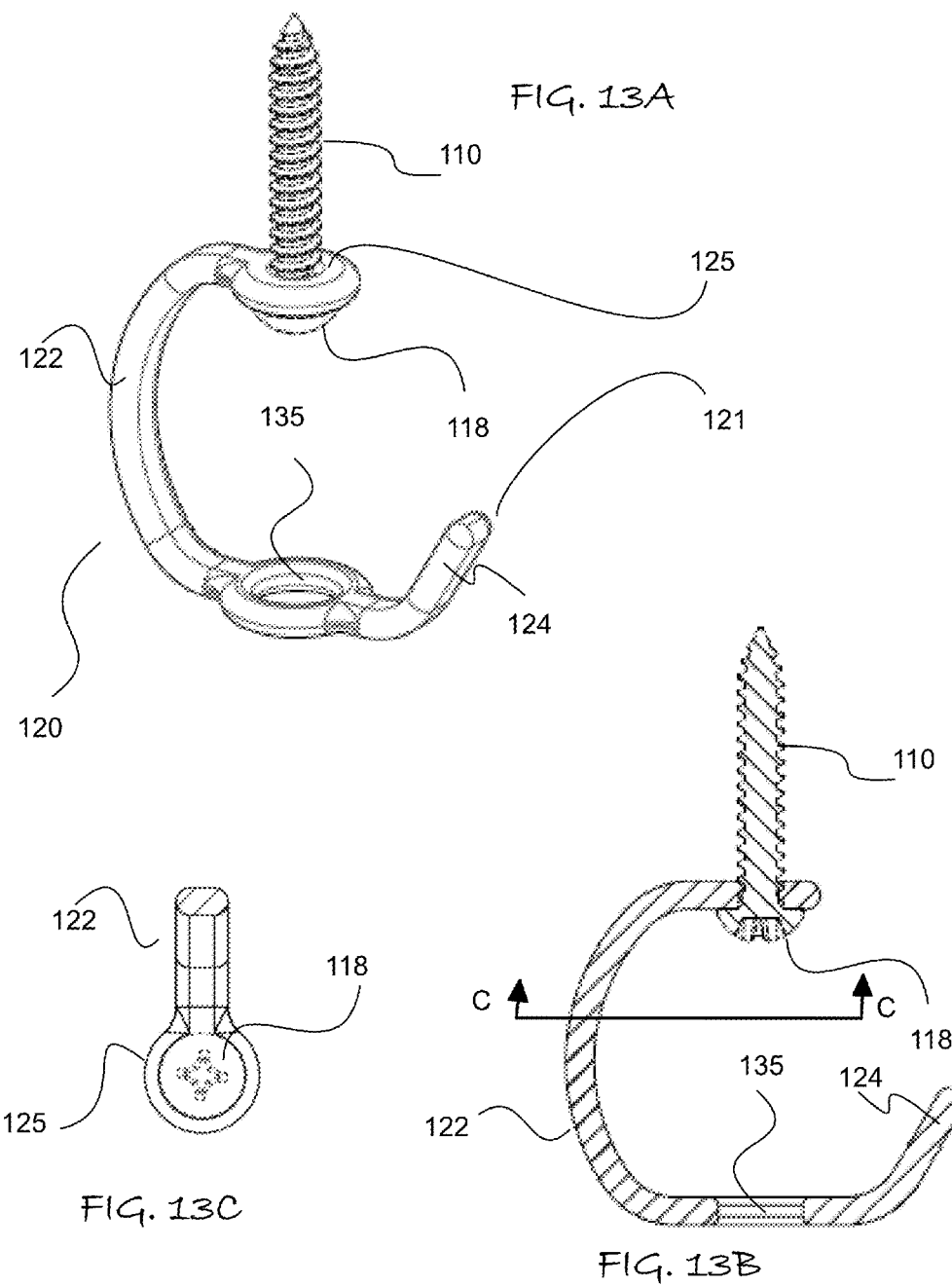
FIG. 13A is a perspective view of another embodiment of the invention in which the fastener is a hook and FIG. 13B is a cross-sectional elevation view thereof and FIG. 13C is a lower side view that includes the section shown at line C-C in FIG. 13B.

FIG. 12 is a perspective view of another embodiment of the invention in which the fastener 100 loop is similarly fabricated to the embodiment of FIG. 11, that is from one or more elongated members, which preferably have a circular cross-sections. Fastener 100 in FIG. 12 then receives a screw 110 in the eyelet or channel 125. However, when 2 preforms are used they need not be welded to the screw or shank below the head 118, but rather welded to each other at 128" to form an eyelet 125 below the shank head 118. The eyelet 125 can also be formed by bending a single wire or deformable elongated member around the shank 110, with the portions on opposing sides of the bend then being deformed to form mirror image half 121/121' as in FIG. 11, which are similar joined by welds 128' and 128".

Figure 14:
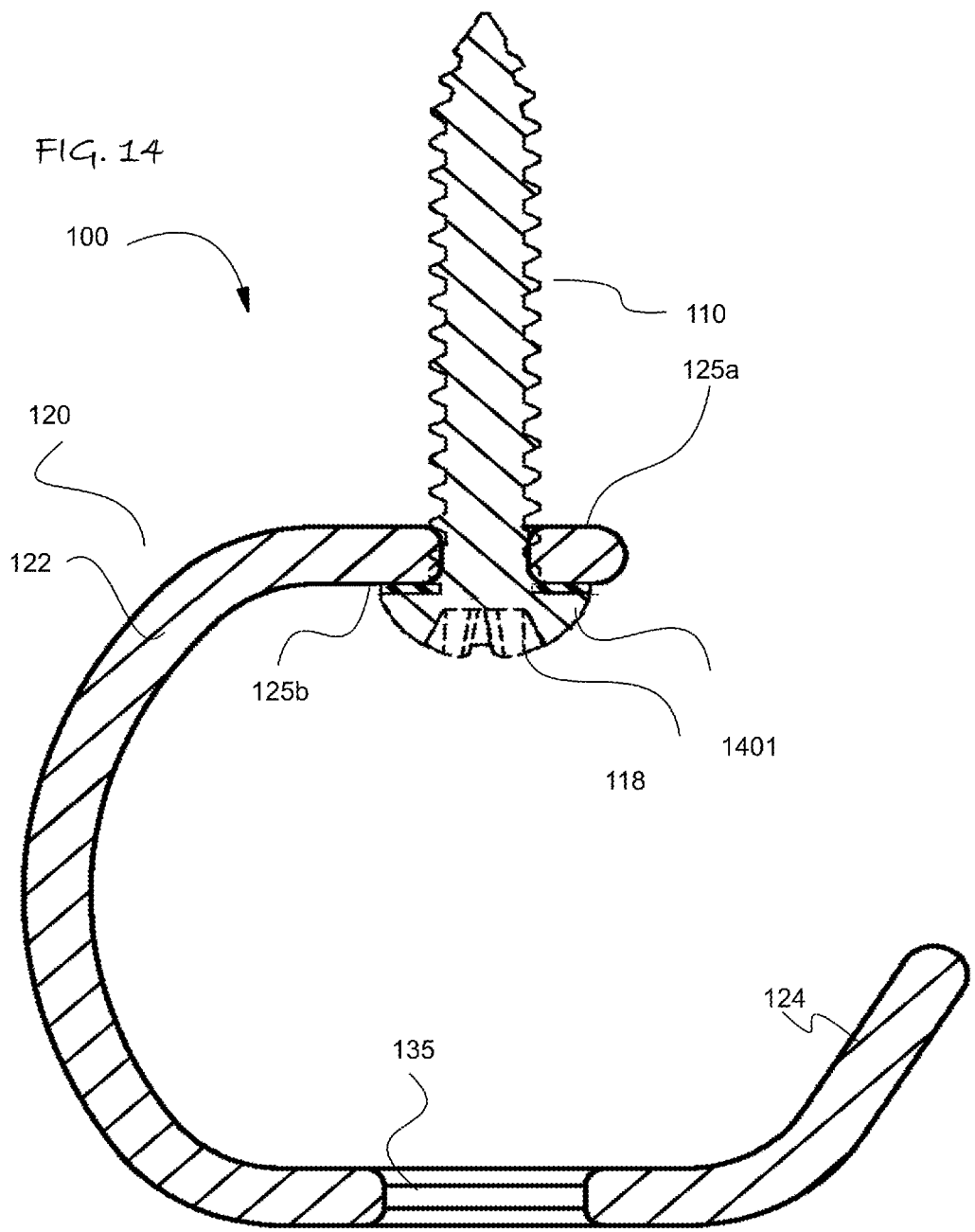
FIG. 14 is a cross-sectional elevation view of another embodiment of the invention in which an adhesive initially hold the screw in the eyelet portion.
Figure 15:
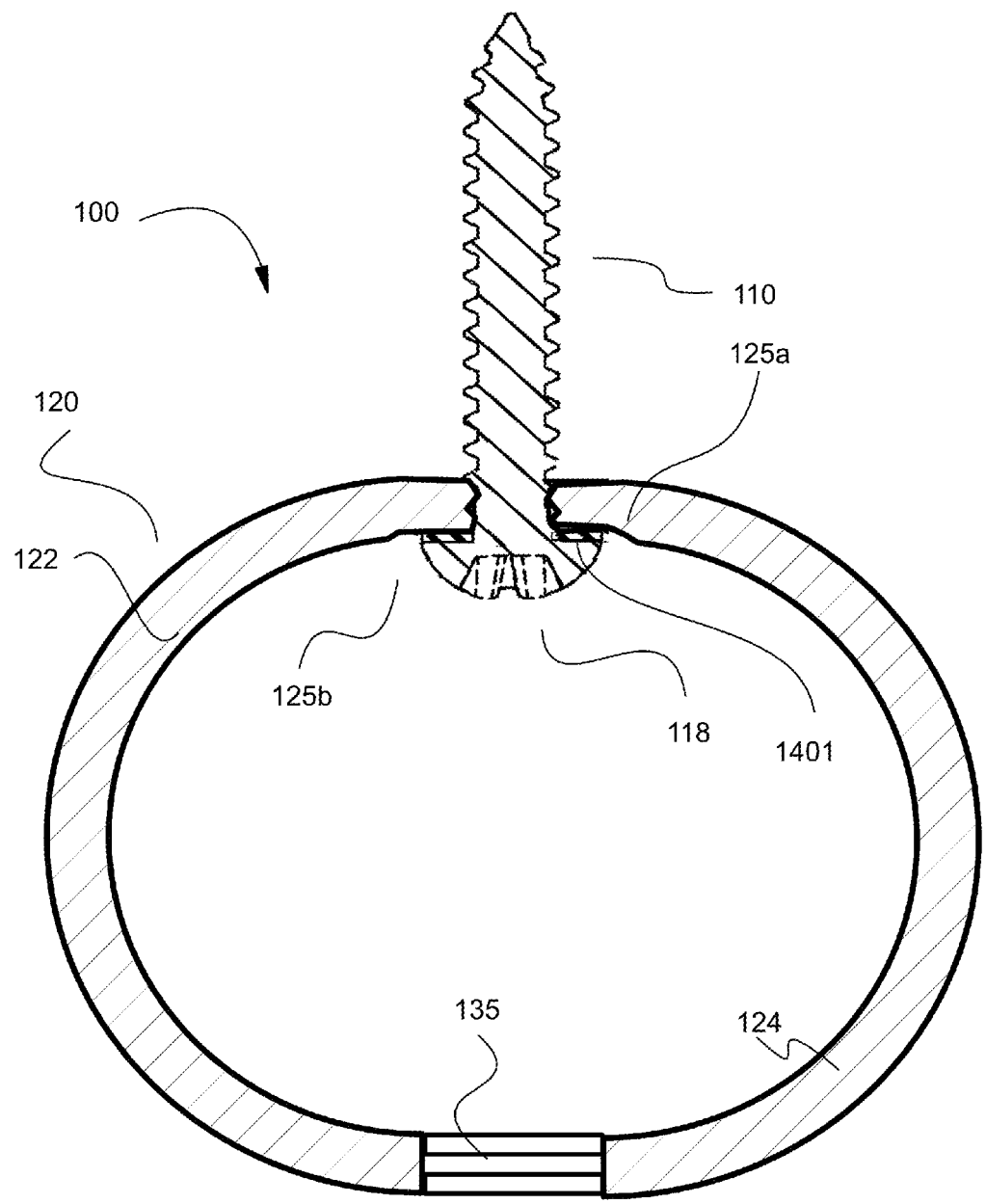
FIG. 15 is a cross-sectional elevation view of another embodiment of the invention in which an adhesive initially hold the screw in the eyelet portion.

In the embodiment of FIG. 13A-C the fastener 100 has the same general shape as the embodiments of FIGS. 11 and 12, but is formed by molding or casting. The screw 110 is separate and hence can be removed from the eyelet or channel 125. More preferably, as shown in FIG. 14, the screw 110 is attached directly or proximal the eyelet or bore 125, such as at lower edge 125b, with a weak adhesive material 1401 so it does not fall out during initially placement during use. When the fastener 100 is initially attached with a power tool the entire fastener 100 will first spin as the screw 110 is rotated by the power tool driver. However, when the upward facing eyelet edge 125a reaches and is then further urged against the wall or ceiling surface the screw 110 will then break free of this temporary adhesive 1401 and continue to rotate but the loop portion 120 will cease to rotate. This permits the full tightening of the screw 110 in the wall or ceiling, but the angular or rotation orientation of the loop 120 can still be adjusted to a final position by hand before fully inserting the screw 110. The adhesive is optionally a water or solvent based organic polymer type adhesive such a Locktite® brand resins, or is a hot melt adhesive. The adhesive 1401 need not be placed around the entire periphery of the screw head, the eyelet 125 or a particular eyelet surface, such as 125a or 125b. It should be apparent that stronger adhesives can be deployed when it is desired to continuously rotate the screw 110 and loop 120 together. The assembly with an adhesive 1401 simplified fabrication by allowing different manufacturing methods for each component, and the mixing of different screws depending on the nature of the wall or ceiling surface the device 100 is to be attached to. FIG. 15-17C illustrate alternative embodiments in which the adhesive 1401 is used with other shape hooks and closed hooks or loops to detachably mount the screw 110 to the eyelet 125.

The loop in this embodiment (FIG. 13A-C and FIG. 14) the loop 120 has several portions, with a flat portion at bore 135 and eyelet or channel opening 125, and curved and optional some flat portion there between. Preferably loop 120 has a curvilinear loop portion 122 that extends between eyelet 125 for receiving the threaded shank 111 and the planar ring structure that defines the bore 135 for receiving the driver of the bolt or shank head 118. The portions of the loop 120 adjacent to bore 135 and on opposing sides thereof are co-planar with the planar ring structure that defines the bore 135 or second eyelet. In this preferred embodiment a linear segment 124 extends from the planar ring structure about bore 135 to the end of the hook 121.

It should be appreciated from these embodiment that the loop 120 can have multiple segments of which some or all are at least part curvilinear in shape or polygonal shaped. For example, in FIG. 3A-C and FIG. 4A-C, portion of the loop 1120 are curvilinear proximal to the connected shank end 111*b*, while the portion opposite the shank axis 112 have a polygonal shape.

It should also be appreciated from the various embodiments described above and illustrated herein that the second end 111*b* of the shank 110 can have a recess 130 to accept any type driver end fitting, such as a Philips head drivers, a "TORX"® drivers, square driver or a hexagonal driver, as well as an external bolt head in place of the recess 130. The bolt head can also be combined with a driver receiving recess 130. Hence the head of the threaded shank or shaft can have various means for receiving rotary driving tools.

It should be understood that the inclusion of various optional features and aspects of the invention in one embodiment does not preclude their use in other and additional embodiments of the invention. Hence, while the invention has been described in connection with various preferred embodiments, it is not intended to limit the scope of the invention to the particular form set forth, but on the contrary, it is intended to cover such alternatives, modifications, and equivalents as may be within the spirit and scope of the invention as defined by the appended claims.

I claim:

1. A method of installing a wall or ceiling mountable fastener, the method comprising the steps of:
   a) providing the wall or ceiling mountable fastener having:
      i) a first eyelet having a rear surface that defines a first plane for making contact with a receiving member, a front surface opposing the rear surface and a first inner channel extending from the front surface to the rear surface thereof for receiving a threaded shaft through a central axis of the first inner channel, the central axis being orthogonal to the first plane,
      ii) a first downward extending portion connected at a proximal end to the first eyelet, and having a distal end opposite the proximal end,
      iii) a second upward extending portion connected at a proximal end to the distal end of the first downward extending portion, and having a distal end opposing the proximal end that is disposed above the first eyelet, wherein a first sub-portion of the second upward extending portion that is at the level of the first eyelet does not intersect the first central axis,
      iv) wherein the threaded shaft that has a threaded portion with a distal end that extends beyond the first eyelet in a direction opposite the second upward extending portion, the shaft having a proximal end opposite the distal end,
      v) a head coupled to an end of the threaded shaft that extends through the first inner channel being disposed on an opposing side of the first eyelet from the distal end of the thread shaft, wherein the head of the shaft has a means for receiving a rotary driver tool,
      vi) wherein one of the threaded shaft and head are coupled to the fastener proximal to the first eyelet with a detachable adhesive,
   b) placing the distal end of the threaded shaft against the receiving member,
   c) engaging the head of the threaded shaft with the rotary driver tool,
   d) energizing the rotary driver tool to rotate the fastener and threaded shaft as a connected unit so the distal end of the threaded shaft penetrates the receiving member,
   e) continuing to energize the rotary driver tool to urge the rear surface of the first eyelet against the receiving member at least until a sufficient rotary friction sufficient to disengage the adhesive connection of the fastener to one of the threaded shaft and the head is applied by the rotary driver tool wherein the fastener no longer rotates with the head of the thread shaft as the rear surface of the first eyelet frictionally engages the receiving member.

2. The method of claim 1 further comprising the steps of:
   a) modifying an angular orientation of the fastener by manually urging at least one of the first downward and second upward portion thereof and b) energizing the rotary driver tool to rotate the threaded shaft until the rear surface of the first eyelet frictionally engages the receiving member to preclude further manual modification of the angular position of the fastener.

3. The method of claim 1 the first sub-portion of the second upward extending portion has a larger inner diameter than the head of the threaded shaft.

4. The method of claim 1 wherein the rotary driver tool extends through the first sub-portion of the second upward extending portion to engage the head of the threaded shaft.

5. The method of claim 1 wherein the first sub-portion of the second upward extending portion is a round bore that has a larger inner diameter than the first inner channel of the first eyelet.

6. The method of claim 1 wherein the receiving member is one of a wall and ceiling.

7. A method of installing a wall or ceiling mountable fastener, the method comprising the steps of:
   a) providing the wall or ceiling mountable fastener having:
      i) a first eyelet having a rear surface that defines a first plane for making contact with receiving member, a front surface opposing the rear surface and a first inner channel extending from the front surface to the rear surface thereof for receiving a threaded fastener through a central axis of the first inner channel, the central axis being orthogonal to the first plane,
      ii) a first downward portion connected at a proximal end to the first eyelet, and having a distal end opposite the proximal end,
      iii) a second upward extending portion connected at a proximal end to the distal end of the first downward extending portion, and having a distal end opposing the proximal end that is disposed above the first eyelet, wherein a first sub-portion of the second upward extending portion that is at the level of the first eyelet does not intersect the first central axis,
      iv) a threaded shaft that has a threaded portion with a distal end that extends beyond the first eyelet in a direction opposite the second upward extending portion, the shaft having a proximal end opposite the distal end,
      v) a head coupled to the proximal end of the threaded shaft being disposed on an opposing side of the first eyelet from the distal end of the thread shaft, wherein the head of the shaft has a means for receiving a rotary driver tool,
      vi) wherein one of the threaded shaft and head are coupled to the fastener proximal to the first eyelet with a detachable adhesive,
   b) placing the distal end of the threaded shaft against the receiving member,
   c) engaging the head of the threaded shaft with the rotary driver tool, d) energizing the rotary driver tool to rotate the fastener and threaded shaft as a connected unit so the distal end of the threaded shaft penetrates the receiving member, e) continuing to energize the rotary driver tool to urge the rear surface of the first eyelet against the receiving member at least until a rotary friction sufficient to disengage the adhesive connection of one of the threaded shaft and the head to the first eyelet is applied by the rotary driver tool wherein the fastener no longer rotates with the head of the thread shaft as the rear surface of the first eyelet frictionally engage the receiving member.

8. The method of claim 7 further comprising the steps of a) modifying an angular orientation of the fastener by manually urging at least one of the first downward and second upward portion thereof and b) energizing the rotary driver tool to rotate the threaded shaft until the rear surface of the first eyelet frictionally engages the receiving member to preclude further manual modification of the angular position of the fastener.

9. The method of claim 7 the first sub-portion of the second upward extending portion has a larger inner diameter than the head of the threaded shaft.

10. The method of claim 7 wherein the rotary driver tool extends through the first sub-portion of the second upward extending portion to engage the head of the threaded shaft.

11. The method of claim 7 wherein the first sub-portion of the second upward extending portion is a round bore that has a larger inner diameter than the first inner channel of the first eyelet.

12. The method of claim 7 wherein the second upward extending portion has a final sub-portion that extends to connect with the first eyelet.

13. The method of claim 12 wherein the first and second portions form a circular eyebolt head.

14. The method of claim 8 the first sub-portion of the second upward extending portion has a larger inner diameter than the head of the threaded shaft.

15. The method of claim 8 wherein the rotary driver tool extends through the first sub-portion of the second upward extending portion to engage the head of the threaded shaft.

16. The method of claim 8 wherein the first sub-portion of the second upward extending portion is a round bore that has a larger inner diameter than the first inner channel of the first eyelet.

17. The method of claim 8 wherein the second upward extending portion has a final sub-portion that extends to connect with the first eyelet.

18. The method of claim 17 wherein the first and second portions form a circular eyebolt head.

19. The method of claim 9 wherein the rotary driver tool extends through the first sub-portion of the second upward extending portion to engage the head of the threaded shaft.

20. The method of claim 9 wherein the first sub-portion of the second upward extending portion is a round bore that has a larger inner diameter than the first inner channel of the first eyelet.

* * * * *